United States Patent [19]

Feustel et al.

[11] Patent Number: 5,346,973
[45] Date of Patent: Sep. 13, 1994

[54] POURABLE LIQUID SURFACTANT CONCENTRATE

[75] Inventors: Dieter Feustel, Monheim; Uwe Held, Velbert; Rainer Hoefer, Duesseldorf; Thomas Engels, Frechen, all of Fed. Rep. of Germany

[73] Assignee: Henkel Kommanditgesellschaft auf Aktien, Duesseldorf, Fed. Rep. of Germany

[21] Appl. No.: 927,626

[22] PCT Filed: Feb. 19, 1991

[86] PCT No.: PCT/EP91/00310

§ 371 Date: Oct. 28, 1992

§ 102(e) Date: Oct. 28, 1992

[87] PCT Pub. No.: WO91/13140

PCT Pub. Date: Sep. 5, 1991

[30] Foreign Application Priority Data

Mar. 1, 1990 [DE] Fed. Rep. of Germany ....... 4006391

[51] Int. Cl.$^5$ .................... C08F 2/00; C11D 1/825
[52] U.S. Cl. .................. 526/209; 252/174.21; 252/174.22; 252/DIG. 1
[58] Field of Search ............ 526/209; 252/174.22, 252/174.21, DIG. 1

[56] References Cited

U.S. PATENT DOCUMENTS

| | | | |
|---|---|---|---|
| 4,492,646 | 1/1985 | Welch | 252/559 |
| 4,792,582 | 12/1988 | Hoefer et al. | 526/209 |
| 4,898,621 | 2/1990 | Pruehs et al. | 252/174.22 |
| 4,898,690 | 2/1990 | Bitter et al. | 252/174.22 |
| 4,925,587 | 5/1990 | Schenker et al. | 252/174.22 |
| 5,074,888 | 12/1991 | Topfl et al. | 252/174.22 |
| 5,174,918 | 12/1992 | Diehl et al. | 252/174.22 |

FOREIGN PATENT DOCUMENTS

| | | | |
|---|---|---|---|
| 0086493 | 8/1983 | European Pat. Off. | 252/174.22 |
| 2900030 | 9/1986 | Fed. Rep. of Germany | |
| 3843713 | 11/1989 | Fed. Rep. of Germany | |
| 38-4691 | 4/1963 | Japan | 526/209 |
| 4510942 | 4/1970 | Japan | 526/209 |
| 56-110800 | 9/1981 | Japan | 252/174.22 |
| 56-159296 | 12/1981 | Japan | 252/174.22 |

OTHER PUBLICATIONS

McCutcheon's Detergents & Emulsifiers 1970 pp. 227, 228.

*Primary Examiner*—Joseph L. Schofer
*Assistant Examiner*—N. Sarofim
*Attorney, Agent, or Firm*—Ernest G. Szoke; Wayne C. Jaeschke; Henry E. Millson, Jr.

[57] ABSTRACT

A pourable aqueous liquid surfactant concentrate containing from about 50 to about 90% by weight of a surfactant mixture comprising:

A) from about 10 to about 90% by weight of at least one compound of the formula $$R^1-O-(CH_2-CH_2O)_n-H \qquad (I)$$

in which $R^1$ is a saturated or unsaturated hydrocarbon radical of a primary $C_{8-22}$ alcohol attached by carbon and n is a number of from 10 to 60; and B) from about 90 to about 10% by weight of at least one compound of the formula $$\begin{array}{c} R^2-CH-CH_2 \\ |\phantom{xxxxxx}| \\ H(OCH_2-CH_2)_p-O \phantom{xx} O-(CH_2-CH_2O)_q-H \end{array} \qquad (II)$$

in which $R^2$ is a saturated or unsaturated $C_{6-14}$ radical attached by carbon, and p and q are each a number of from 0 to 25, the sum of p and q being a number from of 5 to 25.

The invention also relates to a process for the preparation of the above surfactant concentrate and to the use of the concentrate in emulsion polymerization reactions.

19 Claims, No Drawings

POURABLE LIQUID SURFACTANT CONCENTRATE

This invention relates generally to surface-active agents and, more particularly, to pourable, liquid surfactant concentrates of nonionic surfactant mixtures in water, to a process for the production of the surfactant concentrates and to their use as a polymerization emulsifier.

Adducts of ethylene oxide with alcohols, above all fatty alcohols, are classified as nonionic surfactants (nonionics) by virtue of their detergent properties. An obstacle to the even broader use of these adducts of ethylene oxide with alcohols (so-called alcohol ethyloxylates) is their poor pourability or rather their high viscosity at temperatures in the range from 5° to 20° C. Attempts to reduce their viscosity by addition of water result either in unwanted gel formation or in surfactant solutions of comparatively low concentration.

DE-PS 28 29 697 describes liquid detergent compositions of adducts of ethylene oxide with fatty alcohols and adducts of ethylene oxide with internal vicinal alkanediols which do not gel on addition of water. However, internal vicinal diols are unsuitable for a number of applications. Accordingly, the liquid detergent compositions according to DE-PS 28 29 697 are of only limited use.

The problem addressed by the present invention, therefore, was to provide pourable liquid surfactant concentrates which would not contain internal vicinal diols.

Accordingly, the present invention relates to a pourable liquid surfactant concentrate containing 50 to 90% by weight surfactant mixtures in water, the surfactant mixtures consisting of compounds corresponding to general formula I

$$R^1-O-(CH_2-CH_2O)_n-H \qquad (I)$$

in which $R^1$ is a saturated or unsaturated hydrocarbon radical of a primary $C_{6-22}$ alcohol attached by carbon and n is a number of 10 to 60, and of compounds corresponding to general formula II

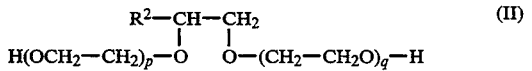

$$\begin{array}{c} R^2-CH-CH_2 \\ | \quad\quad | \\ H(OCH_2-CH_2)_p-O \quad O-(CH_2-CH_2O)_q-H \end{array} \qquad (II)$$

in which $R^2$ is a saturated or unsaturated $C_{8-16}$ radical attached by carbon and p and q are each a number of 0 to 25, the sum of p and q being a number of 5 to 25.

The compounds corresponding to general formula I are adducts of ethylene oxide with saturated and/or unsaturated primary alcohols containing 6 to 22 carbon atoms and having a degree of ethoxylation n of 10 to 60. The adducts of ethylene oxide with primary alcohols are produced by known methods. Saturated and/or unsaturated primary alcohols containing 6 up to and including 22 carbon atoms and preferably 6 to 20 carbon atoms may be used as the starting material. Branched, unbranched, even-numbered or odd-numbered primary alcohols and mixtures thereof may also be used. Even-numbered, unbranched and saturated primary alcohols and mixtures thereof are preferably used. Fatty alcohol mixtures of the type obtained in the sodium reduction or catalytic hydrogenation of fatty acid mixtures from the hydrolysis of native fats and oils are particularly suitable. Examples of such fatty alcohol mixtures are the technical coconut oil, palm kernel oil, tallow, soybean oil and linseed oil fatty alcohols and, in particular, hydrogenation products thereof.

The ethoxylation of the primary (fatty) alcohols or mixtures thereof is carried out at elevated temperature and pressure in the presence of suitable alkoxylation catalysts. The choice of the alkoxylation catalyst influences the width of the spectrum of adducts, the so-called homolog distribution, of ethylene oxide with the alcohol. Thus, so-called broad-range adducts are obtained in the presence of the catalytically, active alkali metal alcoholares, such as sodium ethylate, while so-called narrow-range products are obtained, for example, in the presence of hydrotalcite as catalyst (P 38 13 910.3)

In one particular embodiment of the present invention, the compounds corresponding to general formula I are prepared by ethoxylation of $C_{6-20}$ fatty alcohols using catalytically active sodium ethylate, 10 to 60 mol ethylene oxide being reacted per mol fatty alcohol depending on the required degree of ethoxylation n.

Compounds corresponding to general formula II are already known as reaction products of ethylene oxide with aliphatic vicinal terminal diols. Thus, DE-PS 11 90 927 describes the reaction of 1,2-diols containing 8 to 26 carbon atoms with ethylene oxide. DE-OS 29 00 030 describes a process for the ring-opening of internal or terminal olefin epoxides containing 6 to 18 carbon atoms with polyhydric alcohols, such as ethylene glycol, and subsequent ethoxylation of the reaction products.

According to the invention, reaction products of ethylene oxide with saturated or unsaturated 1,2-diols containing 8 to 16 carbon atoms are used as the compounds of general formula II. Adducts of ethylene oxide with linear 1,2-diols containing an odd and even number of carbon atoms or mixtures thereof are preferably used as the compounds corresponding to formula II. Ethoxylated 1,2-diols containing 12 and/or 14 carbon atoms are particularly suitable. These ethoxylated 1,2-alkanediols are produced in known manner from olefins and olefin mixtures containing terminal double bonds by epoxidation and subsequent catalytic ring opening of the resulting terminal epoxyalkanes with ethylene glycol. The ring opening of the 1,2-epoxyalkanes with ethylene glycol may be catalyzed by acids or bases. Acid-catalyzed ring opening gives approximately 50% of 1-hydroxy-2-(2-hydroxyethoxy)-2-alkanes which contain two primary hydroxyl groups and which can further react with ethylene oxide in substantially the same way. Ring opening of the 1,2-epoxyalkanes with an excess of ethylene glycol can also be catalyzed with a base. Base-catalyzed ring opening largely produces 1-(2-hydroxyethoxy)-2-hydroxyalkanes which contain one primary and one secondary hydroxyl group and which continue reacting with ethylene oxide, preferably at the primaryhydroxyl group. Compounds corresponding to general formula II which have been obtained by the acid-catalyzed ring opening of terminal epoxyalkanes with ethylene glycol are preferably used for the purposes of the invention.

The 1,2-diols are converted into the compounds of general formula II by ethoxylation. The ethoxylation can be carried out by the methods already described in connection with the compounds of general formula I which, depending on the choice of the alkoxylation catalysts, lead to narrow-range products or to relatively broad-range products. The 1,2-diols are preferably ethoxylated using sodium methylate which leads to broad-range adducts. Compounds of general formula II obtained by reaction of aliphatic vicinal diols with up to 25 mol ethylene oxide per mol diol, the two hydroxyl groups of the 1,2-diols optionally differing in their degrees of ethoxylation p and q, are used for the purposes of the invention. The degrees of ethoxylation p and q independently of one another may be numbers of 0 to 25, with the proviso that the sum of p and q is in the range from 5 to 25, preferably in the range from 5 to 20, more preferably in the range from 5 to 15 and, most preferably, in the range from 8 to 12.

In one particular embodiment, ethoxylation of the primary alcohols and the 1,2-diols by the methods already described may even be carried out in a single reaction step providing the degree of ethoxylation n of the primary alcohols and the degree of ethoxylation of the 1,2-diols as the sum of p and q are in the same range.

The surfactant concentrate according to the invention contains the compounds corresponding to general formula I and the compounds corresponding to general formula II as a surfactant mixture. The surfactant mixtures present consist of 10 to 90% by weight, preferably 30 to 85% by weight and, more preferably, 50 to 80% by weight of compounds corresponding to general formula I and of 10 to 90% by weight, preferably 15 to 70% by weight and, more preferably, 20 to 50% by weight of compounds corresponding to general formula II, based on non-aqueous components of the surfactant mixtures.

The pourable liquid surfactant concentrate according to the invention consists of surfactant mixture and water. The surfactant mixture is present in the surfactant concentrate according to the invention in quantities of 50 to 90% by weight and preferably in quantities of 60 to 90% by weight, based on surfactant concentrate.

In one preferred embodiment of the invention, the surfactant concentrate contains 80 to 90% by weight, based on the concentrate, of a surfactant mixture consisting of the preferred fatty alcohols having a degree of ethoxylation n, where n is a number of 10 to 25, and an ethoxylated 1,2-diol, the degrees of ethoxylation p and q of the two hydroxyl groups being a number of 0 to 12 and the sum of p and q being in the range from 8 to 12.

In another preferred embodiment of the invention, the surfactant concentrate contains 60 to 80% by weight, based on concentrate, of a surfactant mixture consisting of fatty alcohols having a degree of ethoxylation n of 25 to 60 and ethoxylated 1,2-diols, the degrees of ethoxylation p and q of the two hydroxyl groups being a number of 0 to 12 and the sum of p and q being in the range from 8 to 12.

The surfactant concentrates according to the invention are liquid and pourable over wide temperature ranges. All the surfactant concentrates are liquid and pourable at room temperature (20° C. to 25° C.). The lower limit to the temperature range in which the surfactant concentrates according to the invention are still liquid and pourable varies with the composition of the surfactant mixture, the primary alcohols and 1,2-diols used and their degrees of ethoxylation. In principle, it may be said that the surfactant concentrates according to the invention are pourable above their solidification points and preferably at about 3° C. above their solidification points. The surfactant concentrates according to the invention have Hoppler viscosities at 20° C. (DIN 53015) in the range from 0.1 to 2 Pas.

The present invention also relates to a process for the production of the surfactant concentrates according to the invention. According to the invention, the compounds corresponding to general formula I, which are produced by methods known per se, are mixed while stirring with compounds corresponding to general formula II, which are also produced by methods known per se, at slightly elevated temperatures and preferably at temperatures of 40° C. to 70° C. and water is then added with stirring in the required ratio at temperatures of 20° C. to 100° C. and preferably at temperatures of 40° C. to 70° C. If any loss of water should occur at the temperatures mentioned, it can be made up by addition of more water after cooling. According to the invention, liquid surfactant concentrates containing—per 100 parts by weight—50 to 90% by weight surfactant mixture consisting of compounds corresponding to general formula I and compounds corresponding to general formula II in water are obtained by this process.

The present invention also relates to the use of the surfactant concentrates according to the invention as an emulsifier in the polymerization of ethylenically unsaturated monomers. According to the invention, the surfactant concentrates may be used as sole emulsifiers (primary emulsifiers) or even together with anionic, nonionic or cationic emulsifiers. According to the invention, the surfactant concentrates are used as emulsifier in a quantity of 0.5 to 10% by weight, preferably in a quantity of 1 to 5% by weight and, more preferably, in a quantity of 1 to 3% by weight, expressed as surfactant concentrate and based on polymerization mixture.

EXAMPLES

A) Production of the Surfactant Mixtures

EXAMPLE 1

A fatty alcohol mixture (component A) containing 0 to 2% by weight n-decanol ($C_{10}$), 70 to 75% by weight lauric alcohol ($C_{12}$), 24 to 30% by weight myristic alcohol ($C_{14}$) and 0 to 2% by weight cetyl alcohol ($C_{16}$) was reacted in known manner with various molar quantities of ethylene oxide (see Table 1). The product obtained was melted, which required temperatures of 40° to 70° C. according to the degree of ethoxylation. Component B was added with stirring to the molten product in various quantities (Table 1). Component B had been prepared by ring-opening of a terminally epoxidized $C_{12/14}$ alkane mixture (67% by weight $C_{12}$ and approx. 33% by weight $C_{14}$) with equimolar quantities of ethylene glycol, based on the epoxide content, and by subsequent reaction with 10 mol ethylene oxide.

EXAMPLE 2

Beef tallow fatty alcohol (component A), an alcohol mixture containing 0 to 2% by weight lauric alcohol, 1 to 7 by weight myristic alcohol, 20 to 30% by weight cetyl alcohol, 60 to 67% by weight oleic alcohol ($C_{18}$) and 0 to 3% by weight arachidyl alcohol ($C_{20}$) was ethoxylated in known manner with various molar quantities of ethylene oxide (Table 2). The product obtained was reacted in various quantities (see Table 2) with component B used in Example 1.

EXAMPLE 3

Ethylene oxide was added in various quantities (see Table 3) in known manner to the fatty alcohol mixture (component A) of Example 1 containing n-decanol lauric alcohol, myristic alcohol and also cetyl alcohol. The product obtained was melted and component B (Table 3) was added with stirring in various quantities to the melt (at 40° to 70° C., depending on the degree of ethoxylation). A mixture of terminally epoxidized $C_{12/14}$ alkanes (67% by weight $C_{12}$ and approx. 33% by weight $C_{14}$) which had been ring-opened with equimolar quantities of ethylene glycol and then reacted with 7 mol ethylene oxide was used as component B.

B) Production of the Surfactant Concentrates

EXAMPLE 4

The surfactant mixtures obtained in accordance with A) were converted with water at temperatures of about 40° to 70° C. into surfactant concentrates which differed in their total surfactant content and in the composition of the surfactant mixture. Water was added to a certain quantity of surfactant mixture in a quantity sufficient to give 100 g of surfactant concentrate. After cooling to room temperature, any water lost was replaced. Table 1 shows the surfactant concentrates of Example 1 in the order of the degree of ethoxylation of the $C_{12/14}$ alcohol mixture and the total content of the formulation. Similarly, Tables 2 and 3 show the surfactant concentrates of Examples 2 and 3 in the order of the degree of ethoxylation of the fatty alcohol mixture and the total content of surfactant mixture in the surfactant concentrate. Accordingly, the notation M/A/B:×°C used in all the Tables means that, of 100 parts surfactant concentrate, M are parts by weight surfactant mixture, the surfactant mixture consisting of A parts of component A and B parts of component B. The surfactant concentrate has a solidification point of ×°C. The solidification point was determined by the cryoscopic method, i.e. the surfactant concentrate was cooled by 2° C. every 60 minutes until it soldified.

All the surfactant concentrates were pourable at room temprature and had Höppler viscosities at 20° C. (DIN 53015) of up to 2 Pas.

TABLE 1

Surfactant concentrate produced in accordance with Example 4 containing surfactant mixtures according to Example 1 with fatty alcohol mixture as component A which has an average degree of ethoxylation of

| 10 EO | 14 EO |
|---|---|
| 80/80/20: 2° C. | 60/60/40: 0° C. |
| 80/70/30: 2° C. | 60/50/50:<0° C. |
| 80/60/40: 1° C. | 70/50/50: 15° C. |
| 80/50/50: 0° C. | 80/80/20: 11° C. |
| 90/80/20: 10° C. | 80/70/30: 10° C. |
| 90/70/30: 9° C. | 80/60/40: 9° C. |
| 90/60/40: 9° C. | 80/50/50: 8° C. |
| 90/50/50: 7° C. | 90/50/50: 17° C. |
| 25 EO | 30 EO |
| 60/70/30: 8° C. | 60/70/30: 12° C. |
| 60/60/40: 0° C. | 60/60/40:<0° C. |
| 60/50/50:<0° C. | 60/50/50:<0° C. |
| 70/80/20: 8° C. | 70/80/20: 13° C. |
| 70/70/30: 6° C. | 70/70/30: 11° C. |
| 70/60/40: 4° C. | 70/60/40: 8° C. |
| 70/50/50: 2° C. | 70/50/50: 3° C. |
| 80/70/30: 16° C. | |
| 80/60/40: 16° C. | |
| 80/50/50: 14° C. | |
| | 60 EO |
| 60/80/20: 5° C. | 60/50/50:<0° C. | 70/60/40: 9° C. |
| 60/70/30: 2° C. | 70/80/20: 14° C. | 70/50/50: 3° C. |
| 60/60/40: 0° C. | 70/70/30: 11° C. | 80/50/50: 15° C. |

TABLE 2

Surfactant concentrate produced in accordance with Example 4 containing surfactant mixtures according to Example 2 with beef tallow fatty alcohol as component A which has an average degree of ethoxylation of

| 25 EO | 40 EO |
|---|---|
| 60/50/50: 6° C. | 60/60/40: 0° C. |
| 65/60/40: 18° C. | 60/50/50:<0° C. |
| 65/50/50:<0° C. | 65/70/30: 12° C. |
| 70/50/50: 8° C. | 65/60/40: 9° C. |
| | 65/50/50: 6° C. |
| | 70/50/50: 13° C. |

TABLE 3

Surfactant concentrate produced in accordance with Example 4 containing surfactant mixture according to Example 3 with fatty alcohol mixture as component A which has an average degree of ethoxylation of

| 10 EO | 14 EO |
|---|---|
| 80/80/20: 4° C. | 80/80/20: 8° C. |
| 80/70/30: 3° C. | 80/70/30: 6° C. |
| 80/60/40:<0° C. | 80/60/40: 4° C. |
| 80/50/50:<0° C. | 80/50/50: 2° C. |
| 25 EO | 30 EO |
| 60/80/20: 12° C. | 60/80/20: 6° C. |
| 60/70/30:<0° C. | 60/70/30: 3° C. |
| 60/60/40:<0° C. | 60/60/40:<0° C. |
| 60/50/50:<0° C. | 60/50/50:<0° C. |
| 65/80/20: 16° C. | 65/80/20: 4° C. |
| 65/70/30: 14° C. | 65/70/30: 0° C. |
| 65/60/40: 14° C. | 65/60/40:<0° C. |
| 65/50/50: 0° C. | 65/50/50:<0° C. |
| 70/80/20: 11° C. | 70/80/20: 12° C. |
| 70/70/30: 10° C. | 70/70/30: 9° C. |
| 70/60/40: 9° C. | 70/60/40: 6° C. |
| 70/50/50: 0° C. | 70/50/50: 4° C. |
| 80/70/30: 10° C. | 80/50/50: 14° C. |
| 80/60/40: 10° C. | |
| 80/50/50: 10° C. | |
| | 60 EO | |
| 60/80/20: 8° C. | 65/70/30: 11° C. | 70/60/40: 12° C. |
| 60/70/30: 2° C. | 65/60/40: 6° C. | 70/50/50: 8° C. |
| 60/60/40: 0° C. | 65/50/50: 0° C. | 80/50/50: 12° C. |
| 60/50/50:<0° C. | 70/70/30: 12° C. | |

C) Comparison Examples

EXAMPLE 5

The fatty alcohol mixture (component A) according to Example 1 containing n-decanol, lauric alcohol, myristic alcohol and cetyl alcohol was reacted in known manner with 5.1 40 mol ethylene oxide,
5.2 50 mol ethylene oxide,
5.3 60 mol ethylene oxide.

The ethoxylated fatty alcohol mixture obtained was melted at 40° to 70° C. and fully deionized water was added to the resulting melt at those temperatures. All the fatty alcohols ethoxylated in accordance with 5.1 to 5.3 were gel-like or solid at room temperature as aqueous preparations containing 50 to 80% by weight surfactant, expressed as fatty alcohol ethoxylate and based on aqueous preparation.

EXAMPLE 6

The fatty alcohol mixture (component A) according to Example 1 containing n-decanol, lauric alcohol, myristic alcohol and also cetyl alcohol was reacted in known manner with 30 mol ethylene oxide, 70 parts by weight of the product mixture obtained were melted (40° to 70° C.) and 30% by weight of the following components were added with stirring to the resulting melt:

6.1 nonylphenol reacted with 10 mol ethylene oxide,
6.2 a synthetic alcohol mixture containing 67% by weight of a primary $C_{13}$ alcohol and 33% by weight of a primary $C_{15}$ alcohol which had been reacted with 10.5 mol ethylene oxide
6.3 1,1-dibutylpentan-1-ol which had been reacted with 10 mol ethylene oxide.

35 Parts by weight water were added at temperatures of 40° C. to 70° C. to 65 parts by weight of the surfactant mixtures obtained in accordance with 6.1 to 6.3. After cooling, any water lost was replaced. The surfactant concentrates all have solidification points above 70° C., i.e. they are not pourable at room temperature.

D) Use as Emulsifier for Emulsion Polymerization

EXAMPLE 7

Various nonionic surfactants were tested for their suitability as emulsifiers for emulsion polymerization. 140.0 g ethyl acrylate, 140.0 g methyl methacrylate, 52.5 g butyl acrylate and acrylic acid were used as the monomers. 10% by weight of the particular monomers were first dissolved in approx. 600 g fully deionized water and, after the addition of 2.0 g Na lauryl sulfate and potassium peroxodisulfate, the resulting solutions were heated to 80° C. After the beginning of polymerization, 10 g nonionic surfactant and the remaining monomers were added to the mixture. After a reaction time of about 2.5 hours, the polymer dispersion was cooled and filtered through an 80μ mesh filter. The quantity of solids remaining in the filter, the coagulate content, is expressed in % by weight solids and based on the solids content of the polymer dispersion.

| Nonionic surfactant (mixture) | Coagulate content [%] |
|---|---|
| Nonylphenol $EO_{30}$ | Approx. 3 |
| $C_{11}$ synthetic alcohol $EO_{40}$ | Approx. 9 |
| Isotridecyl alcohol $EO_{30}$ | Approx. 7 |
| Beef tallow alcohol $EO_{40}$ | <3 |
| Surfactant concentrate [65/70/30] containing the surfactant mixture acc. to Ex. 1 (component A containing 30 EO) | <1 |
| Surfactant concentrate [80/70/30] containing the surfactant mixture acc. to Ex. 1 (component A containing 10 EO) | <1 |
| Surfactant concentrate [80/70/30] containing the surfactant mixture acc. to Ex. 3 (component A containing 10 EO) | <1 |

The results show that the surfactant concentrates according to the invention stabilize the emulsions excellently during the polymerization reaction.

EXAMPLE 8

Various nonionic surfactant (mixture)s were tested for their suitability as emulsifiers for emulsion polymerization. 240.0 g styrene, 240.0 g butyl acrylate, 10.0 g acrylamide and 10.0 g acrylic acid were used as the monomers. 7.5 g nonylphenol sulfate $EO_{28}$, 5.0 g nonionic surfactant (mixture), 10% by weight of the monomer mixture and 10% by weight of an initiator solution of 2 g potassium peroxodisulfate in 98.0 g water were first added to 387.5 g water, followed by heating to around 80° to 85C. After the beginning of polymerization, the remaining monomers and the remaining initiator solution were added dropwise over a period of 2 hours.

After the dropwise addition, the reaction mixture was post-polymerized for about 1.5 hours at the temperatures mentioned above. After cooling, 3.0 g of a 25% by weight ammonia were added to the polymer dispersion.

The polymer dispersion was analyzed for coagulate content as in Example 7. The minimum film-forming temperature of the emulsion (DIN 53782), the particle size and also the water absorption of the films drawn from the dispersions were also determined. To determine water absorption, the polymer dispersion was poured into a Teflon mold (75×35×5) and dried for hours at 50° C. in a recirculating air drying cabinet. The plastic molding obtained was weighed and then left standing for 24 hours in fully deionized water, blotted with a cellular cloth and reweighed. The water absorption is expressed in % by weight, based on the weight of the plastic molding.

| Nonionic surfactant | Coagulate [%] | Particle size [nm] | Water absorption [%] | Minimum film forming temperature [°C.] |
|---|---|---|---|---|
| Nonylphenol $EO_{30}$ | 2 | 136 | 4.0 | 19 |
| Surfactant concentrate [65/70/30] containing the surfactant mixture acc. to Ex. 1 (component A $EO_{30}$) | 2 | 128 | 4.7 | 18 |
| Surfactant concentrate [80/70/30] containing the surfactant mixture acc. to Ex. 1 (component A $EO_{10}$) | 1 | 136 | 4.5 | 18 |
| Surfactant concentrate [65/70/30] containing the surfactant mixture acc. to Ex. 2 (component A $EO_{40}$) | 5 | 132 | 4.4 | 20 |

Example 8 shows that the toxicologically unsafe nonionic surfactant nonylphenol $EO_{30}$ can be replaced by the detergent formulations according to the invention without any deterioration in performance properties.

What is claimed is:

1. A pourable aqueous liquid surfactant concentrate containing from about 50 to about 90% by weight of a surfactant mixture comprising:

A) from about 10 to about 90% by weight of at least one compound of the formula $$R^1-O-(CH_2-CH_2O)_n-H \qquad (I)$$

in which $R^1$ is a saturated or unsaturated hydrocarbon radical of a primary $C_{8-22}$ alcohol attached by carbon and n is a number of from 25 to 60; and B) from about 90 to about 10% by weight of at least one compound of the formula

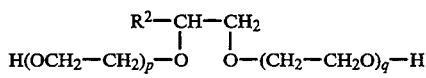

in which $R^2$ is a saturated or unsaturated $C_{6-14}$ radical attached by carbon, and p and q are each a number of from 0 to 25, the sum of p and q being a number of from 5 to 25.

2. The surfactant concentrate of claim 1 in which the surfactant concentrate contains from about 60 to about 90% by weight of the surfactant mixture.

3. The surfactant concentrate of claim 1 in which the surfactant concentrate contains from about 60 to about 80% by weight of the surfactant mixture, and in component B) p and q are each a number of from 0 to 12 and the sum of p and q is a number of from 8 to 12.

4. The surfactant concentrate of claim 1 wherein the concentrate has a Hoeppler viscosity at 20° C. of from about 0.1 to about 2 Pas.

5. The surfactant concentrate of claim 1 wherein in component B) $R^2$ contains 10 or 12 carbon atoms.

6. The surfactant concentrate of claim 1 wherein in component A) $R^1$ is a saturated, even-numbered, unbranched hydrocarbon radical.

7. The surfactant concentrate of claim 1 wherein in component A) the $R^1$ group is from an alcohol obtained from fatty acid mixtures resulting from the hydrolysis of a naturally occurring fat or oil.

8. The surfactant concentrate of claim 1 wherein in component B) the sum of p and q is a number of from 5 to 20.

9. The surfactant concentrate of claim 8 wherein the sum of p and q is a number of from 5 to 15.

10. The surfactant concentrate of claim 8 wherein the sum of p and q is a number of from 8 to 12.

11. The surfactant concentrate of claim 1 wherein in the surfactant mixture component A) is present in from about 30 to about 85% by weight, and component B) is present in from about 70% to about 15% by weight.

12. The surfactant concentrate of claim 11 wherein component A) is present in from about 50 to about 80% by weight, and component B) is present in from about 50 to about 20% by weight.

13. The surfactant concentrate of claim 12 wherein in component A) $R^1$ is a saturated, even-numbered, unbranched hydrocarbon radical, and in component B) $R^2$ contains 10 or 12 carbon atoms.

14. A process for the preparation of the surfactant concentrate of claim 1 comprising the steps of
   a) mixing components A) and B) together at a temperature in the range of from about 40° to about 70° C.;
   b) adding a measured quantity of water to the mixture from step a) at a temperature in the range of from about 20° to about 100° C.;
   c) cooling the resulting aqueous concentrate from step b); and
   d) replacing any water lost during steps b) and c).

15. The process of claim 14 in which step b) is carried out at a temperature in the range of from about 40° to about 70° C.

16. In the emulsion polymerization of ethylenically unsaturated monomers, the improvement wherein the surfactant concentrate of claim 1 is added to the emulsion polymerization reaction mixture.

17. The emulsion polymerization of claim 16 wherein from about 0.5 to about 10% by weight of the surfactant concentrate is added to the polymerization reaction mixture, based on the weight of said mixture.

18. The emulsion polymerization of claim 17 wherein from about 1 to about 5% by weight of surfactant concentrate is added to the polymerization reaction mixture.

19. The emulsion polymerization of claim 18 wherein from about 1 to about 3% by weight of surfactant concentrate is added.

* * * * *